(12) United States Patent
Mi

(10) Patent No.: US 7,193,670 B2
(45) Date of Patent: Mar. 20, 2007

(54) COMPENSATOR FOR LIQUID CRYSTAL DISPLAY WITH TWO COMPENSATION SHEETS

(75) Inventor: Xiang-Dong Mi, Rochester, NY (US)

(73) Assignee: Nitto Denko Corporation, Osaka (JP)

( * ) Notice: Subject to any disclaimer, the term of this patent is extended or adjusted under 35 U.S.C. 154(b) by 642 days.

(21) Appl. No.: 10/123,936

(22) Filed: Apr. 17, 2002

(65) Prior Publication Data
US 2003/0197821 A1 Oct. 23, 2003

(51) Int. Cl.
*G02F 1/1335* (2006.01)

(52) U.S. Cl. ....................................................... 349/119

(58) Field of Classification Search ................ 349/117, 349/119
See application file for complete search history.

(56) References Cited

U.S. PATENT DOCUMENTS

| | | | |
|---|---|---|---|
| 5,406,396 A * | 4/1995 | Akatsuka et al. | 349/118 |
| 5,557,434 A * | 9/1996 | Winker et al. | 349/117 |
| 5,978,055 A | 11/1999 | Van De Witte et al. | |
| 6,160,597 A * | 12/2000 | Schadt et al. | 349/98 |
| 6,867,835 B2 * | 3/2005 | Lee et al. | 349/124 |

FOREIGN PATENT DOCUMENTS

EP 1 143 271 10/2001

OTHER PUBLICATIONS

Y. Satoh, et al., "Comparison of Nematic Hybrid and Discotic Hybrid Films as Viewing Angle Compensator for NW-TN-LCDs", SID 2000 Digest, pp. 347-349.
J. Chen, et al., "Wide Viewing Angle Photoaligned Plastic Films", SID 99 Digest, pp. 98-101.

* cited by examiner

*Primary Examiner*—Andrew Schechter
*Assistant Examiner*—Richard H Kim
(74) *Attorney, Agent, or Firm*—Westerman, Hattori, Daniels & Adrian, LLP.

(57) ABSTRACT

Disclosed is an optical compensator comprising two substantially identical integral optical components, each of the said optical components containing a substrate, an orientation layer, and an anisotropic layer, in that order, wherein the said two optical components are bonded together in parallel so that the anisotropic layer in one component is positioned orthogonally relative to the anisotropic layer in the other about an axis perpendicular to the plane of the substrates. Also disclosed is a process for making such a compensator.

7 Claims, 5 Drawing Sheets

COMPENSATOR FOR LIQUID CRYSTAL DISPLAY WITH TWO COMPENSATION SHEETS

FIELD OF THE INVENTION

This invention relates to an optical compensator for improving viewing angle characteristics of liquid crystal displays employing two substrate-borne virtually identical compensation sheets oriented orthogonally to each other.

BACKGROUND OF THE INVENTION

Current rapid expansion in the liquid crystal display (LCD) applications in various areas of information display is largely due to improvements of display qualities. Contrast, color reproduction, and stable gray scale intensities are important quality attributes for electronic displays, which employ liquid crystal technology. The primary factor limiting the contrast of a liquid crystal display is the propensity for light to "leak" through liquid crystal elements or cell, which are in the dark or "black" pixel state. Furthermore, the leakage and hence contrast of a liquid crystal display are also dependent on the angle from which the display screen is viewed. Typically the optimum contrast is observed only within a narrow viewing angle centered about the normal incidence to the display and falls off rapidly as the viewing angle is increased in color displays, the leakage problem not only degrades the contrast but also causes color or hue shifts with an associated degradation of color reproduction. In addition to black-state light leakage, the narrow viewing angle problem in typical twisted nematic liquid crystal displays is exacerbated by a shift in the brightness-voltage curve as a function of viewing angle because of the optical anisotropy of the liquid crystal material.

Thus, one of the major factors measuring the quality of such displays is the viewing angle characteristic, which describes a change in contrast ratio from different viewing angles. It is desirable to be able to see the same image from a wide variation in viewing angles and this ability has been a shortcoming with liquid crystal display devices. One way to improve the viewing angle characteristic is to insert a compensator (also referred as compensation film, retardation film, or retarder) with proper optical properties between the polarizer and liquid crystal cell, such as disclosed in U.S. Pat. No. 5,583,679 (Ito et al.), U.S. Pat. No. 5,853,801 (Suga et al.), U.S. Pat. No. 5,619,352 (Koch et al.), U.S. Pat. No. 5,978,055 (Van De Witte et al.), and U.S. Pat. No. 6,160,597 (Schadt et al.). A compensation film according to U.S. Pat. No. U.S. Pat. No. 5,583,679 (Ito et al.) and U.S. Pat. No. 5,853,801 (Suga et al.), based on discotic liquid crystals which have negative birefringence, is widely used. It offers improved contrast over wider viewing angles, however, it suffers larger color shift for gray level images, compared to a compensator made of liquid crystalline materials with positive birefringence, according to Satoh et al. ("Comparison of nematic hybrid and discotic hybrid films as viewing angle compensator for NW-TN-LCDs", SID 2000 Digest, pp.347–349, (2000)). To achieve comparable performance in the contrast ratio while reducing color shift, one alternative is to use a pair of crossed liquid crystal polymer films (LCP) on each side of liquid crystal cell, as discussed by Chen et al. ("Wide Viewing Angle Photoaligned Plastic Films", SID 99 Digest, pp.98–101(1999)). This paper states that "since the second LPP/LCP retarder film is coated directly on top of the first LCP retarder film, the total thickness of the final wide-view retarder stack is only a few microns thin". Although they provide very compact optical component, one of the challenges of this method is to make two LCP layers crossed.

It is a problem to be solved to provide an optical compensator that widens the viewing angle characteristics of liquid crystal displays, in particular Twisted Nematic (TN), Super Twisted Nematic (STN), Optically Compensated Bend (OCB), In Plane Switching (IPS), or Vertically Aligned (VA) liquid crystal displays, and is readily manufactured. These various liquid crystal display technologies have been reviewed in U.S. Pat. No. 5,619,352 (Koch et al.), U.S. Pat. No. 5,410,422 (Bos), and U.S. Pat. No. 4,701,028 (Clerc et al.).

SUMMARY OF THE INVENTION

The invention provides an optical compensator comprising two substantially identical integral optical components, each of the said optical components containing a substrate, an orientation layer, and an anisotropic layer, in that order, wherein the said two optical components are bonded together in parallel so that the optic axis of the anisotropic layer in one component is positioned orthogonally relative to the respective optic axis of the anisotropic layer in the other about an axis perpendicular to the plane of the substrates. The invention also provides a process for making such compensators.

The optical compensator widens the viewing angle characteristics of liquid crystal displays, and in particular of Twisted Nematic (TN), Super Twisted Nematic (STN), Optically Compensated Bend (OCB), In Plane Switching (IPS), or Vertically Aligned (VA) liquid crystal displays and is readily manufactured.

DETAILED DESCRIPTION OF THE INVENTION

Figure 1A:
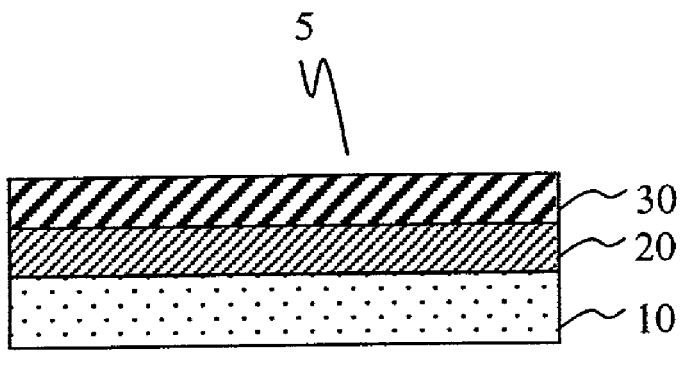
FIGS. 1A, 1B, and 1C are cross-sectional schematic views of prior art compensators.

The current invention regarding the optical compensator for liquid crystal displays is described by referring to the drawings as follows.

FIG. 1A shows a cross-sectional schematic view of an optical compensator 5 according to the prior art, such as disclosed in U.S. Pat. No. 6,160,597 (Schadt et al.). This compensator comprises a substrate 10 of transparent or reflecting material, such as glass or polymer. On the substrate 10, an orientation layer 20 is applied, and an anisotropic layer 30 is disposed on top of 30 layer 20. The orientation layer 20 can be made of cinnamic acid derivatives, and oriented and cross-linked by linear polarized UV light. It can also be a polyimide or polyvinyl alcohol layer oriented by rubbing, or a layer of SiOx fabricated by oblique deposition, or a layer oriented by other orientation techniques. The anisotropic layer 30 is typically a liquid crystalline monomer when it is first disposed on the orientation layer 20, such as a diacrylate or diepoxide, and is crosslinked by a further UV radiation, or polymerized by other means such as heat. The optic axis in the anisotropic layer 30 is usually tilted relative to the layer plane, and varies across the thickness direction while this type of compensator provides some desired optical properties, it is not sufficient in many applications, for example, as a compensator for Twisted Nematic (TN) Liquid Crystal Displays (LCDs).

Figure 1B:
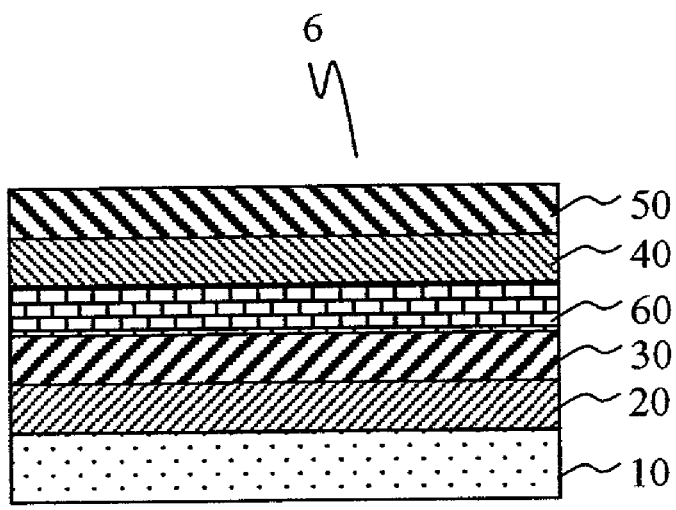
Figure 1C:
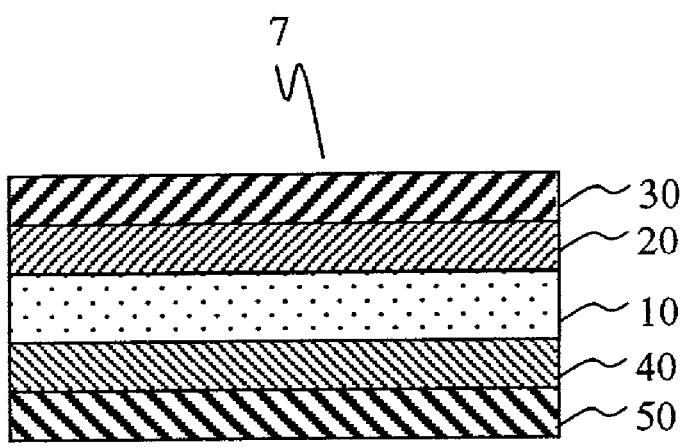

FIG. 1B illustrates a more sophisticated optical compensator 6 by providing a second orientation layer 40 and a second anisotropic layer 50 on top of the first anisotropic layer 30, also according to U.S. Pat. No. 6,160,597 (Schadt et al.). The second orientation layer 40 and the second anisotropic layer 50 are made essentially in the same way as the first orientation layer 20 and the first anisotropic layer 30 are made, except that the direction of the orientation may vary. It is desirable to provide a compensator such that the projections of optic axes in layers 30 and 50 onto the plane of substrate are orthogonal when viewed from substrate normal direction. For the purpose of illustration, refer to an XYZ coordinate system 80 as shown in FIG. 213. The X and Y axes are parallel to the plane of substrate 78, and the Z-axis is perpendicular to the plane of substrate 78. The angle $\phi$ is measured from the X-axis in the XY plane, and referred as an azimuthal angle. The angle $\theta$ is measured from the XY plane, and referred as a tilt angle. In one example, the optic axis 84 in the anisotropic layer 30 varies across the thickness direction (or Z direction). The tilt angle $\theta$ that the optic axis 84 makes relative to the XY plane varies from $\theta_1$ at one side to $\theta_2$ at the other side of the anisotropic layer 30. The azimuthal angle $\phi$ of the optic axis 84 is 0 degree since it is parallel to the X-axis. The second anisotropic layer 50 in FIGS. 1B and 1C is preferred to be oriented as the anisotropic layer 230 shown in FIG. 213. The tilt angle of the optic axis 86 in the anisotropic layer 230 changes across the Z direction in the same fashion as that of its counterpart optic axis 84 in the anisotropic layer 30. However, the azimuthal angle of the optic axis 86 is parallel to the Y-axis, differing from the azimuthal angle of the optic axis 84 by 90 degrees. Thus the projections of the optic axes 84 and 86 onto the plane of substrate 78 are orthogonal to each other. The orientation of the optic axis in the anisotropic layer in term of the azimuthal angle $\phi$ and the tilt angle $\theta$ is controlled by the orientation layer. In the case that the orientation of orientation layers is achieved by linearly polarized UV radiation, a UV exposure unit which generates UV light must provide satisfactory curing throughput, and the degree of polarization at two orthogonal azimuthal angles. This is very difficult, especially in a large size of manufacturing, for example, when a 54 inch wide substrate 10 is used. An alternative is to make two UV exposure units to provide similar curing throughput and degree of polarization at each of the desired azimuthal angles. This is unfavorable especially when only a limited space is available in a coating environment. In the case that the orientation layers are oriented by rubbing the orientation layers, it is easy to rub the substrate along the roll moving direction, however, it is extremely difficult to rub the orientation layer in a direction perpendicular to the substrate roll direction. In both cases, the problem is that two pairs of orientation layers and anisotropic layers must be made and oriented in a crossed arrangement. Additionally, the first anisotropic layer 30 may exert an orientating effect on the second orientation layer 40, therefore a de-coupling layer 60 is required to be disposed between layers 30 and 40 in some cases. It is desirable to make an optical compensator in a fewer steps.

U.S. Pat. No. 5,978,055 (Van De Witte et al.) disclosed another type of optical compensator 7 as shown in FIG. 1C, which is made by providing a second orientation layer 40 and a second anisotropic layer 50 on the opposite side of the substrate 10. The optic axis in this type of compensator has the same azimuthal angle on both sides. The compensator 7 has the same problem as the one 6 shown in FIG. 1B when it comes to making the two anisotropic layers oriented orthogonally.

Figure 2A:
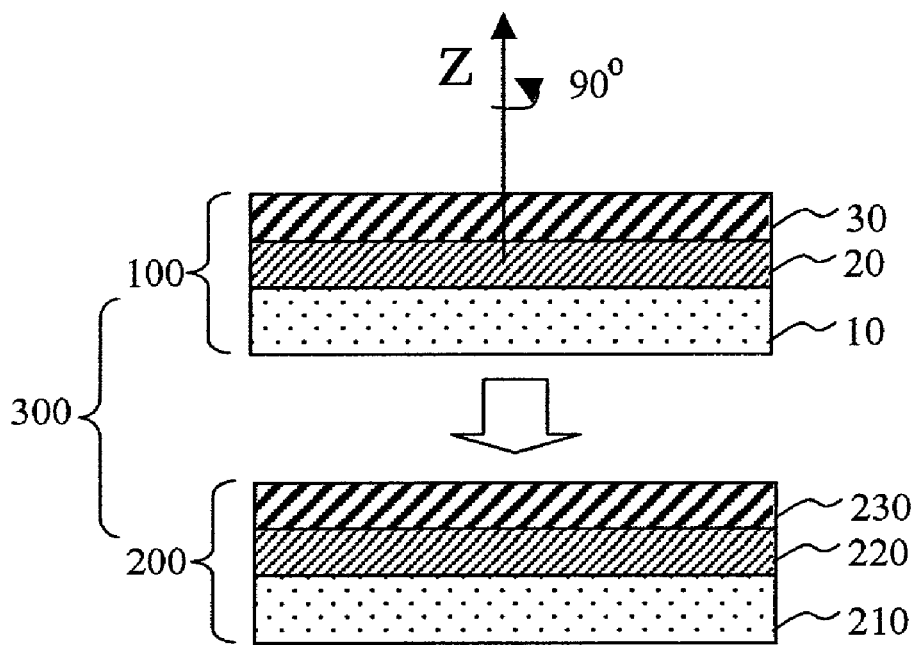
FIGS. 2A and 2B are schematic concepts in accordance with the present invention.
Figure 2B:
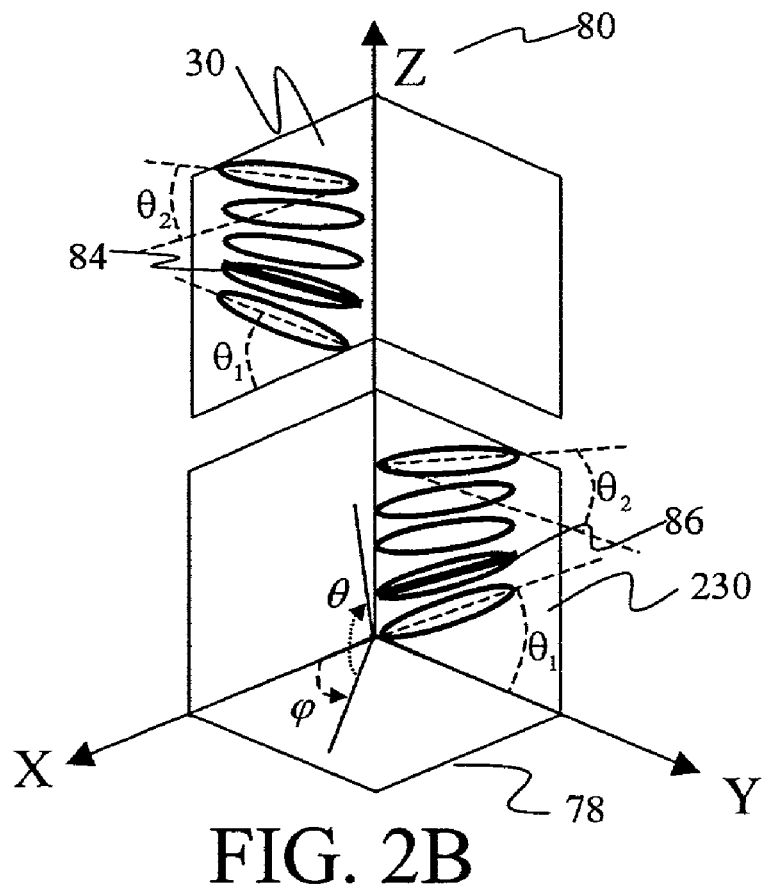

Referring to FIG. 2A, an optical compensator 300 of the present invention comprises two substantially identical integral optical components 100 and 200, each of the said optical components, take the optical component 100 as an example, containing a substrate 10, an orientation layer 20, and an anisotropic layer 30, in that order, wherein the said two optical components are bonded together in parallel so that the optic axis of the anisotropic layer in one component is positioned orthogonally relative to the respective optic axis of the anisotropic layer in the other about an axis perpendicular to the plane of the substrates. The optical components 100 and 200 can be the same as the prior art optical compensator 5 as shown in FIG. 1A. They are regarded as substantially identical since they are preferred to be fabricated in the same process. The optical component 200 contains a substrate 210, an orientation layer 220, and an anisotropic layer 230, in that order. When the optical component 100 is rotated by 90 or −90 degrees about the Z-axis, which is perpendicular to the plane of the substrate, it becomes the optical component 200. Because 100 and 200 are used as components of the optical compensator 300, they are referred as optical components, although each of them functions as a compensator individually. The optical component 100 or 200, like the prior art compensator 5 as shown in FIG. 1A, can be made by various ways as discussed above. In one example, the substrate 10 is a transparent polymer (more than 80% transmittance), such as tri-acetyl cellulose, and it has low in-plane retardation, preferably less than 10 nm, and more preferably less than 5 nm. In some other cases, the substrate 10 is preferred to have larger in-plane retardation between 15 to 150 nm. Typically, when the substrate 10 is made of triacetyl cellulose, it has out-of-plane retardation around −40 nm to −120 nm. This is a desired property when the compensator is designed to compensate a liquid crystal state with an ON voltage applied. The in-plane retardation and out-of-plane retardation discussed above are defined as $(n_x-n_y)d$ and $[n_z-(n_x+n_y)/2]d$, respectively. The refractive indices $n_x$ and $n_y$ are along the slow and fast axes in plane of the substrate 78, respectively, $n_z$ is the refractive index along the substrate thickness direction (Z-axis), and d is the substrate thickness. The orientation layer 20 is disposed on substrate 10 on a continuous web. After the orientation effect is achieved by linear polarized UV light, a mixture of liquid crystalline monomers such as diacrylates and solvent is applied onto the orientation layer. The solvent then evaporates and liquid crystalline monomers are crosslinked by UV irradiation. Both the optical components 100 and 200 are made essentially in the same processes. For example, both are cut off from the same roll fabricated according to the above processes. One of the components such as 200 is rotated by approximately 90 or −90 degrees about the Z-axis and is bonded together with another component 100 which is not rotated to form the compensator 300.

The orientation layer can be oriented by various techniques. In one example, the orientation layer contains a photo-orientable material such as cinnamic acid derivatives and can be oriented by a photo-alignment technique. In another example, the orientation layer contains a rubbing-orientable material such as a polyimide or polyvinyl alcohol and can be oriented by a rubbing technique. In another example, the orientation layer contains a shear-orientable material and can be oriented by a shear-alignment technique. In another example, the orientation layer contains a rubbing-orientable material such as and can be oriented by a rubbing technique. In another example, the orientation layer contains an electrically- or magnetically-orientable material and can be oriented by an electrically- or magnetically-alignment technique. It should be understood that to be called as a substrate, a layer must be solid and mechanically strong so that it can stand alone and support other layers. A typical substrate is made of triacetate cellulose (TAC), polyester, polycarbonate, or other transparent polymers, and has a thickness of 25 to 500 micrometers. Glass is also usually used as a substrate. In comparison, the orientation layer or anisotropic layer is usually less than 5 micrometers thick, and more often less than 2 micrometers, and cannot be used and considered as a substrate.

It should also be understood that the optic axis in each of the anisotropic layers 30 and 230 can have a variable tilt angle and/or variable azimuthal angle. For example, the optic axis 84 in the anisotropic layer 30 of the component 100 has a variable tilt angle θ across the Z-axis ranging from $\theta_1$ to $\theta_2$. In another example, the optic axis 84 has a fixed tilt angle θ across the Z-axis, namely, $\theta_1=\theta_2$. In another example, the optic axis 84 is contained in one plane such as the XZ plane and consequently has a fixed azimuthal angle φ across the Z-axis. In another example, although the anisotropic layer 30 is still oriented along the preferred direction forced by the orientation layer at their interface, the optic axis 84 has a variable azimuthal angle φ across the Z-axis. The azimuthal angle of the optic axis 84 can be varied by adding a proper amount of chiral dopant into the anisotropic layer 30. In another example, the optic axis 84 has a variable tilt angle θ and a variable azimuthal angle φ across the Z-axis. Like the optic axis 84 of the optical component 30, the optic axis 86 of the optical component 230 can also have a fixed tilt angle, a variable tilt angle, a fixed azimuthal angle, a variable azimuthal angle, or a variable tilt angle and a variable azimuthal angle across the Z-axis. Because the optical components 100 and 200 are identical, they can be bonded together so that the optic axis of the anisotropic layer in one component is positioned orthogonally relative to the respective optic axis of the anisotropic layer in the other about an axis perpendicular to the plane of the substrates. When the azimuthal angle of the optic axis varies across the Z-axis, the optic axis of the anisotropic layer in one component is not orthogonal relative to each varying optic axis of the anisotropic layer in the other, instead, it is orthogonal relative to the respective (or counterpart) optic axis of the anisotropic layer in the other, about an axis perpendicular to the plane of the substrates. For example, the optic axis 84 of the optical component 30 is the respective optic axis 86 of the optical component 230 when they are positioned at the same distance from their respective orientation layers. Even though the optic axis of the anisotropic layer in one component is preferred to be orthogonal (or ±90 degrees) relative to the respective (or counterpart) optic axis of the anisotropic layer in the other about an axis perpendicular to the plane of the substrates, it should be understood that the angle between the optic axis of the anisotropic layer in one component and the respective optic axis of the anisotropic layer in the other can be in a range of 85 to 95 degrees to be considered as orthogonal. It should also be understood that the compensator with one component rotated by 90 degrees may have different optical effects than the one with a component rotated by −90 degrees. The rotation of either 90 degrees or −90 degrees must match with the handedness of the liquid crystal cell if the liquid crystal is rotated across the thickness such as in a Twisted Nematic mode.

As is well known in the art, the optic axis of a material means an axis along which a beam of light traveling through it does not experience birefringence. The material forming an anisotropic layer may has one or two optic axes. When the material forming an anisotropic layer has one optic axis, it may show positive birefringence or negative birefringence. In a preferred embodiment, the anisotropic layers contain a material such as a diacrylate or diepoxide with positive birefringence as disclosed in U.S. Pat. No. 6,160,597 (Schadt et al.). In another embodiment, the anisotropic layers contain a material with negative birefringence, such as a discotic liquid crystal disclosed in U.S. Pat. No. 5,583,679 (Ito et al.). In the case that the anisotropic layer containing a material with two optic axes, the optic axis 84 in the anisotropic layer 30 is the same optic axis 86 in the anisotropic layer 230.

Figure 3A:
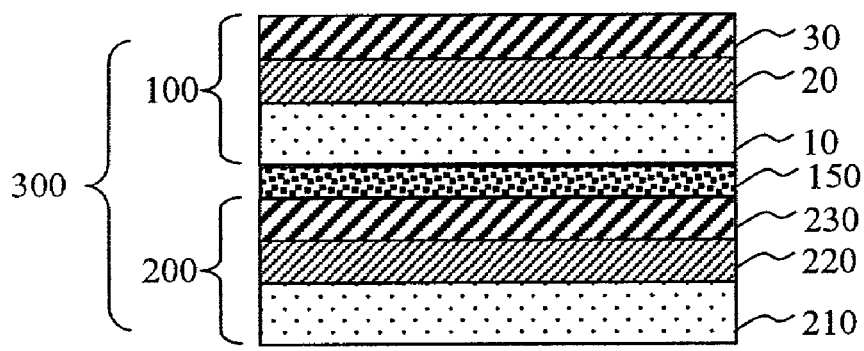
FIGS. 3A, 3B, and 3C are cross-sections of various embodiments of the present invention.
Figure 3B:
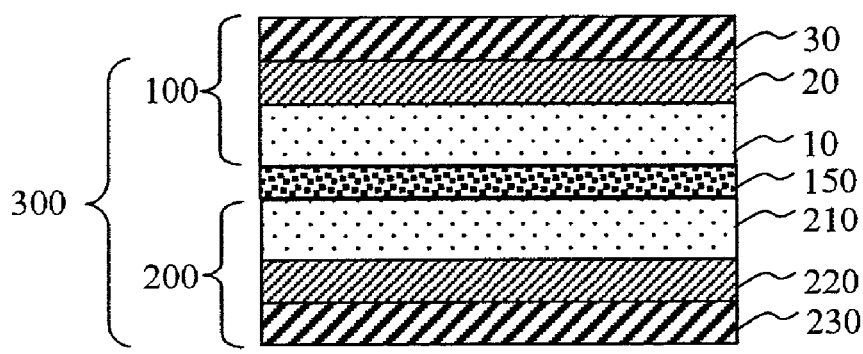
Figure 3C:
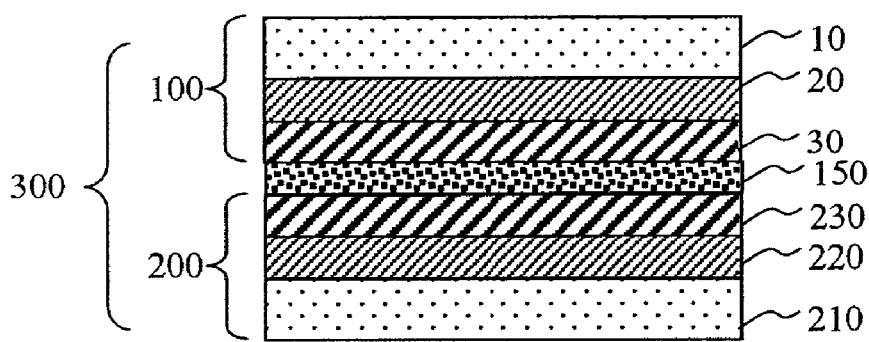

FIGS. 3A through 3C are various embodiments of optical compensators 300 in accordance with the present invention. In the compensator 300 as shown in FIG. 3A, the two components 100 and 200 are bonded together at the substrate 10 of one component 100 and the anisotropic layer 230 of the other component 200. In the compensator 300 as shown in FIG. 3B, the two components 100 and 200 are bonded together at the two substrates 10 and 210. The two components 100 and 200 can also be bonded together at the two anisotropic layers 20 and 220 to form a compensator 300, as shown in FIG. 3C. In the compensator 300, the two optical components 100 and 200 can be bonded together in parallel by a variety of means. In one example, they are bonded together in parallel using an adhesive layer such as Optically Clear Adhesives from 3M of St. Paul, Minn. In another alternative, they can be bonded together in parallel by a melted surface layer. The bonding layer 150 shown in FIGS. 3A, 3B, and 3C can be an adhesive layer, a melted surface layer, or any other layers which can bond the two optical components 100 and 200 together. The bonding layer 150 is preferred to be optically isotropic and therefore does not affect the optical performance of the compensator 300. In the case that the bonding layer 150 has non-negligible birefringence, its thickness must be well controlled and the retardation from the components 100 and 200 must be adjusted accordingly.

One method of forming a component 100 or 200 of the compensator 300 according to the present invention is that the orientation of the anisotropic layer 30 is accomplished using a photo-alignment step. The orientation layer 20 is treated by a linear polarized UV light and subsequently aligns the anisotropic layer 30. The compensator 300 can also be made easily with orientation achieved by rubbed polyimide, or other means.

According to another aspect of the present invention, the compensator 300 can be manufactured by a process comprises the steps of coating an orientation layer 20 in a solvent onto a first substrate 10, drying the orientation layer 20, orienting the orientation layer 20 in a predetermined direction, coating all anisotropic layer 30 including a polymerizable material in a solvent carrier onto the orientation layer 20, drying the anisotropic layer 30, polymerizing the anisotropic layer 30 to form a first integral component 100, repeating the above steps to form a second integral component 200 comprising a second substrate 210, a second orientation layer 220, and a second anisotropic layer 230, and bonding together the first and second integral components 100, 200 made according to the above processes so that the optic axis of the anisotropic layer 30 in one component 100 is positioned orthogonally relative to the respective optic axis of the anisotropic layer 230 in the other 200 about an axis perpendicular to the plane of the substrates (the Z-axis). The orientation layers 20, 220 are oriented by rubbing, or by photo-alignment techniques, or any other known means. The two components 100 and 200 can be made according to the same roll-to-roll processes comprising the steps of coating an orientation layer in a solvent onto a moving substrate, drying the orientation layer, orienting the orientation layer in a predetermined direction, coating an anisotropic layer including a polymerizable material in a solvent carrier onto the orientation layer, drying the anisotropic layer, and polymerizing the anisotropic layer to form a roll of integral component, from which individual components 100 and 200 can be cut off and bonded together so that the optic axis of the anisotropic layer in one component is positioned orthogonally relative to the respective optic axis of the anisotropic layer in the other about an axis perpendicular to the plane of the substrates (the Z-axis) as shown in FIG. 2A. The predetermined direction can be any convenient direction suitable for manufacturing. In one case, the predetermined direction is parallel to the roll moving direction. This direction is particularly preferred when the orientation layer is oriented by rubbing. In another case, the predetermined direction is the direction perpendicular to the roll moving direction. This direction can be used when the orientation layer is oriented by photo-alignment technique. In either case, the means to orient the orientation layer is only required to orient the orientation layer in one direction. This is significantly simpler than the means that are required to orient the orientation layer in two orthogonal directions.

Figure 5A:
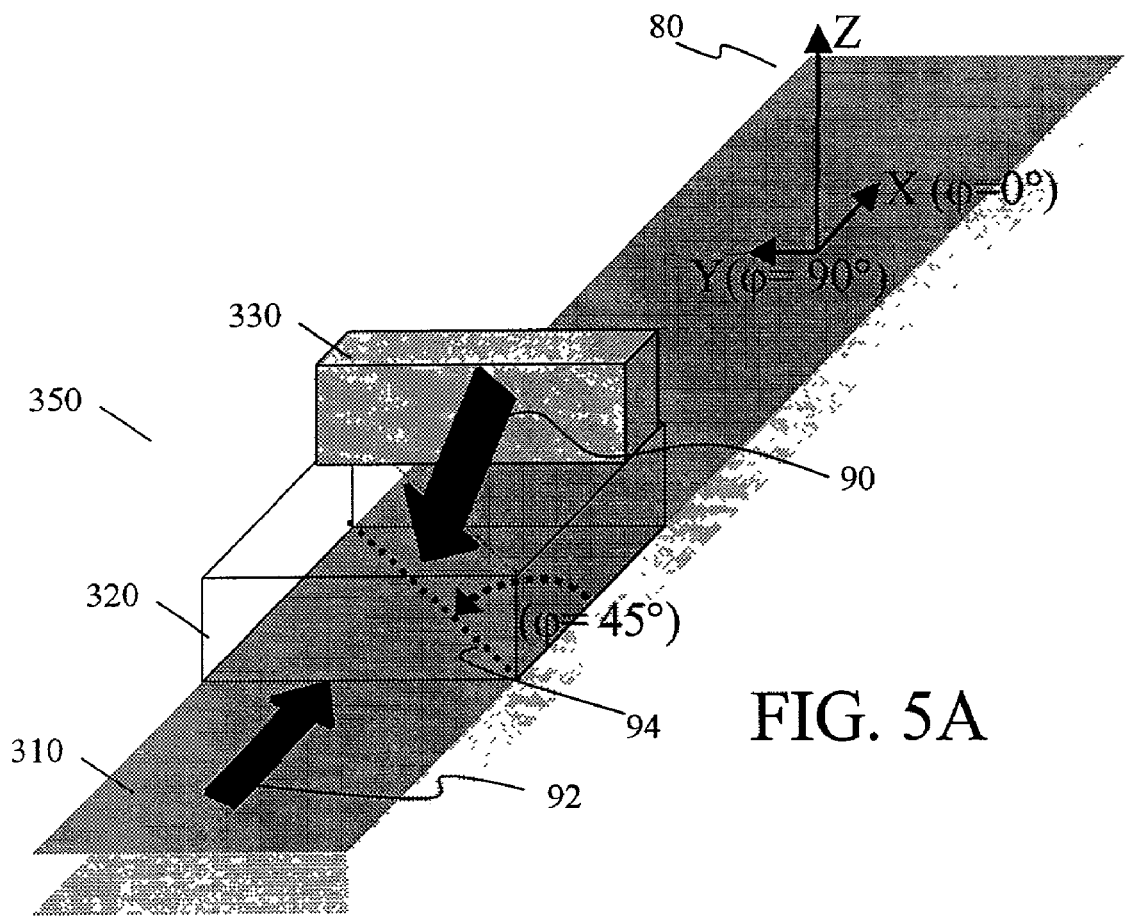
FIGS. 5A and 5B show a roll-to-roll process for making a compensator according to the present invention.
Figure 5B:
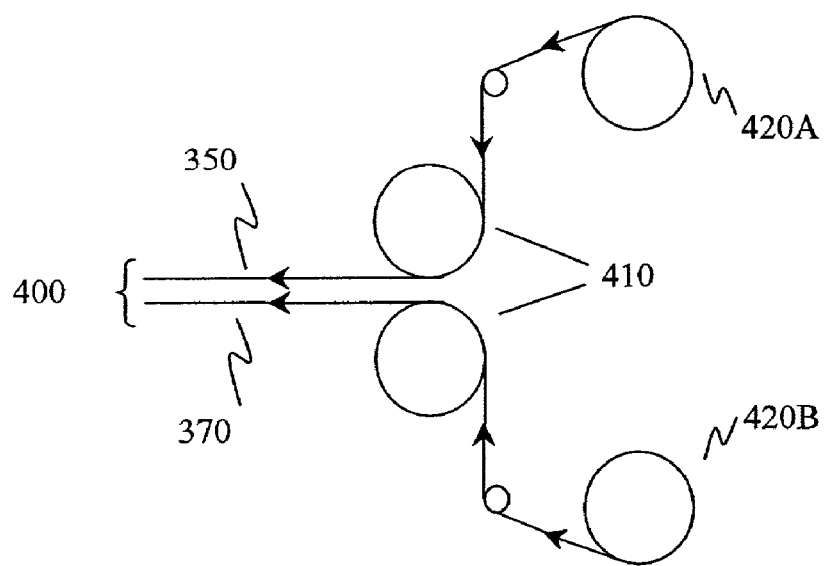

According to another aspect of the present invention, the compensator 300 can be manufactured on a roll-to-roll basis as shown in FIGS. 5A and 5B. Both FIGS. 5A and 5B show part of schematic views of the process. The roll-to-roll process of forming a roll of optical compensator 400 comprises the steps of coating an orientation layer 320 in a solvent onto a moving substrate 310, drying the orientation layer 320, orienting the orientation layer 320 in a predetermined alignment direction 94 of 45 degrees ($\phi=45°$) relative to the roll moving direction 92, roll coating an anisotropic layer 330 including a polymerizable material in a solvent carrier onto the orientation layer 320, drying the anisotropic layer 330, polymerizing the anisotropic layer 330 to form a first roll of multilayer integral component 350, winding it up, repeating the above steps to form a second roll of multilayer integral component 370, and bonding together the two rolls of integral components 350, 370 made according to the above processes so that the optic axis of the anisotropic layer in one component is positioned orthogonally relative to the respective optic axis of the anisotropic layer in the other about an axis perpendicular to the plane of the substrates using a roll-to-roll laminator 410. One feature of the roll-to-roll manufacturing process according to the invention to fabricate the optical compensator 400 is that the orientation layer 320 contained in a roll of component 350 is oriented in a direction 94 of 45 degrees ($\phi=45°$) relative to the roll moving direction 92, so that when two rolls of such components (for example, 350 and 370) are bonded together by a roll-to-roll laminator 410, the anisotropic layer in one component can be positioned orthogonally relative to the anisotropic layer in the other about an axis perpendicular to the plane of the substrates. Note that for clarity, FIG. 5A only shows part of the orientation layer 320 and anisotropic layer 330.

FIG. 5B shows that two rolls of components 350 and 370 are provided from two supply rollers 420A and 420B, and are bonded together by a roll-to-roll laminator 410 to form a roll of optical compensator 400. When two rolls of components (for example, 350 and 370) are bonded together at the substrates of the two components, the formed roll of optical compensator 400 corresponds to the compensator 300 shown in FIG. 3B. When the two rolls of components are bonded together at the anisotropic layers of the two components, the formed roll of optical compensator 400 corresponds to the compensator 300 shown in FIG. 3C. When the two rolls of components are bonded together at the substrate of one component and the anisotropic layer of the other component, the formed roll of optical compensator 400 does not meet the requirement that the optic axis of the anisotropic layer in one component is positioned orthogonally relative to the respective optic axis of the anisotropic layer in the other about an axis perpendicular to the plane of the substrates. Instead, the optic axis of the anisotropic layer in one component is positioned parallel relative to the respective optic axis of the anisotropic layer in the other. If the orientation layers in the roll of components (for example, 350 and 370) are not oriented in a direction of 45 degrees relative to the roll moving direction, the optical compensator 400 made by bonding two rolls of such components at the anisotropic layers of the two components or at the substrates of the two components will not meet the requirement that the optic axis of the anisotropic layer in one component is positioned orthogonally relative to the respective optic axis of the anisotropic layer in the other about an axis perpendicular to the plane of the substrates. Instead, the angle between the optic axis of the anisotropic layer in one component and the optic axis of the anisotropic layer in the other is either greater than or less than 90 degrees. Although the orientation layer in the roll of component is preferred to be oriented in a direction of 45 degrees relative to the roll moving direction, it should be understood within the scope of the invention that the orientation layer can be oriented in a range of directions around 45 degrees from 40 to 50 degrees relative to the roll moving direction. Note that two rolls of components with the orientation layers oriented at two different predetermined directions may also be bonded using a roll-to-roll laminator to form a roll of optical compensator satisfying the requirement that the optic axis of the anisotropic layer in one component is positioned orthogonally relative to the respective optic axis of the anisotropic layer in the other about an axis perpendicular to the plane of the substrates. However, this is not desirable because of increasing complexity in orienting the orientation layers in two different directions.

Figure 4A:
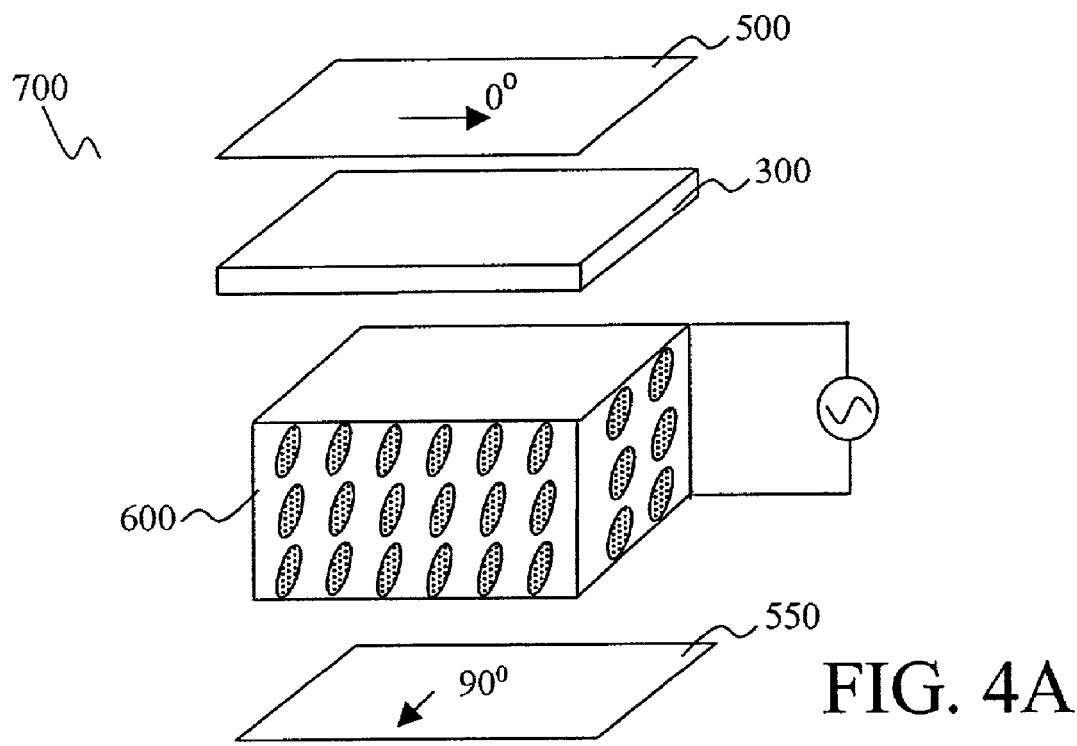
FIGS. 4A and 4B show a liquid crystal display in combination with a compensator according to the present invention.
Figure 4B:
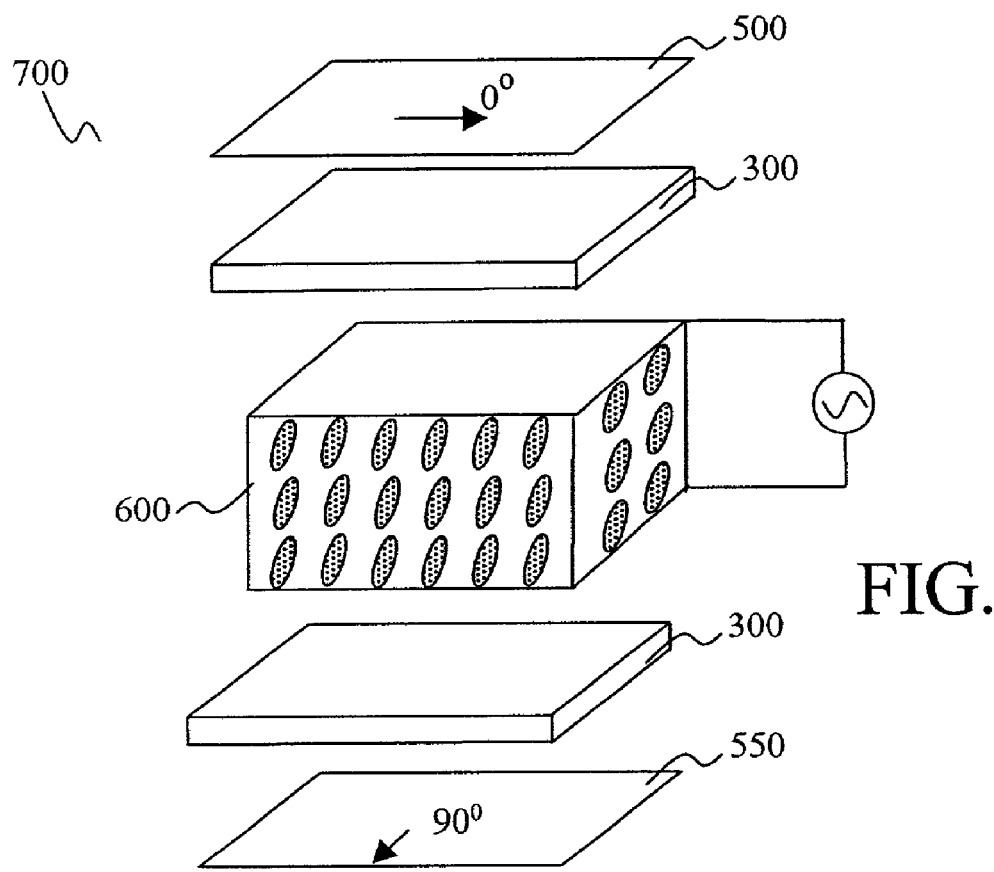

In one embodiment, the orientation layer is oriented by rubbing the orientation layer in a direction 94 of 45 degrees ($\phi=45°$) relative to the roll moving direction 92. In another embodiment, the orientation layer is oriented by photo-alignment technique, for example, the orientation layer is exposed to a linearly polarized ultraviolet (UV) light indicated by 90 rubbing the orientation layer in a direction 94 of 45 degrees ($\phi=45°$) relative to the roll moving direction 92. The UV light 90 makes an angle with the roll. It may or may not be collimated, however, the projection (pointing along 94) of the principal ray of the light 90 onto the roll makes an angle of about 45 degrees relative to the roll moving FIGS. 4A and 4B are schematic views of a liquid crystal display 700 comprising the compensator 300 in accordance with the present invention. In FIG. 4A, one compensator 300 is positioned between a first polarizer 500 and the liquid crystal cell 600. This compensator 300 can also be placed between the second polarizer 550 and the liquid crystal cell 600. In FIG. 4B, one compensator 300 is placed between the first polarizer 500 and the liquid crystal cell 600, and another compensator 300 is placed between a second polarizer 550 and the liquid crystal cell 600. The liquid crystal cell 600 is preferred to be operated in a Twisted Nematic (TN), Super Twisted Nematic (STN), Optically Compensated Bend (OCB), In Plane Switching (IPS), or Vertically Aligned (VA) mode. In this particular example, a Vertically Aligned liquid crystal mode is shown in FIGS. 4A and 4B. The polarizers 550 and 500 can be arranged crossed or parallel depending on the operation principles of the liquid crystal cell. The orientation layer in the compensator can be arranged parallel, perpendicular, or at a predetermined angle relative to the first polarizer 500. The liquid crystal cell can also be operated in a reflective mode, in which it may only require one polarizer.

The invention may be used in conjunction with electronic imaging device comprising a liquid crystal display device. The energy required to achieve this control is generally much less than that required for the luminescent materials used in other display types such as cathode ray tubes. Accordingly, liquid crystal technology is used for a number of applications, including but not limited to digital watches, calculators, portable computers, electronic games for which light weight, low power consumption and long operating life are important features.

The entire contents of the patents and other publications referred to in this specification are incorporated herein by reference.

PARTS LIST 5 prior art optical compensator
6 prior art optical compensator
7 prior art optical compensator
10 substrate
20 orientation layer
30 anisotropic layer
40 orientation layer
50 anisotropic layer
60 de-coupling layer
78 plane of substrate (or xy plane)
80 xyz coordinate system
84 optic axis in the anisotropic layer 30
86 optic axis in the anisotropic layer 230
90 roll moving direction
92 alignment direction
94 optical component
150 bonding layer
200 optical component
210 substrate
220 orientation layer
230 anisotropic layer
300 compensator according to the present invention
310 moving substrate
320 orientation layer
330 anisotropic layer
350 a roll of integral component
370 a roll of integral component
400 a roll of optical compensator
410 a laminator
420A supply roller
420B supply roller
500 polarizer
550 polarizer
600 liquid crystal cell
700 liquid crystal display
$\theta$ tilt angle
$\theta_1$ tilt angle at one side.
$\theta_2$ tilt angle at the other side.
$\phi$ azimuthal angle

What is claimed is:

1. A reflective liquid crystal display comprising a twisted nematic liquid crystal cell, only one polarizer and an optical compensator comprising two substantially identical integral optical components, each of the said optical components containing a substrate, an orientation layer, and an anisotropic layer, in that order, wherein the said two optical components are bonded together in parallel so that the optic axis of the anisotropic layer in one component is positioned orthogonally relative to the respective optic axis of the anisotropic layer in the other about an axis perpendicular to the plane of the substrates.

2. The display of claim 1 wherein the two components are bonded together at the substrate of one component and the anisotropic layer of the other component.

3. The display of claim 1 wherein the optic axis of each of the anisotropic layers has a fixed azimuthal angle.

4. The display of claim 1 wherein the optic axis of each of the anisotropic layers has a fixed tilt angle.

5. The display of claim 1 wherein the optic axis of each of the anisotropic layers has a variable azimuthal angle.

6. The display of claim 1 wherein the optic axis of each of the anisotropic layers has a variable tilt angle.

7. The display of claim 1 wherein the optic axis of each of the anisotropic layers has a variable tilt angle and a variable azimuthal angle.

* * * * *